(12) United States Patent  
Milt et al.

(10) Patent No.: US 12,254,728 B2  
(45) Date of Patent: Mar. 18, 2025

(54) CARTRIDGE-ACCEPTING DEVICE WITH AN AUTHENTICATION CIRCUIT

(71) Applicant: Zeptive, Inc., Burlington, MA (US)

(72) Inventors: Stephen S. Milt, Winchester, MA (US); Loucinda C. Bistany, Methuen, MA (US); William D. Hargett, Chelmsford, MA (US); Robert S. Mawrey, Ashland, MA (US)

(*) Notice: Subject to any disclaimer, the term of this patent is extended or adjusted under 35 U.S.C. 154(b) by 765 days.

(21) Appl. No.: 17/084,764

(22) Filed: Oct. 30, 2020

(65) Prior Publication Data

US 2021/0134095 A1 May 6, 2021

Related U.S. Application Data

(60) Provisional application No. 62/929,747, filed on Nov. 1, 2019.

(51) Int. Cl.
| | |
|---|---|
| *A24F 40/42* | (2020.01) |
| *A24F 40/10* | (2020.01) |
| *A24F 40/53* | (2020.01) |
| *A24F 40/65* | (2020.01) |
| *G06F 21/44* | (2013.01) |
| *G07C 9/00* | (2020.01) |

(52) U.S. Cl.  
CPC .......... *G07C 9/00571* (2013.01); *A24F 40/10* (2020.01); *A24F 40/42* (2020.01); *A24F 40/53* (2020.01); *A24F 40/65* (2020.01); *G06F 21/44* (2013.01)

(58) Field of Classification Search  
CPC .......... A24F 40/42; A24F 40/53; A24F 40/65; G07C 9/00571; G06F 21/44  
See application file for complete search history.

(56) References Cited

U.S. PATENT DOCUMENTS

2018/0132530 A1* 5/2018 Rogers .................. A24F 40/40  
2021/0401061 A1* 12/2021 Davis .................... A24F 40/57

* cited by examiner

*Primary Examiner* — Christopher M Rodd  
*Assistant Examiner* — Jennifer A Kessie

(57) ABSTRACT

A self-authenticating cartridge-accepting device includes a cartridge receptacle adapted to accept a cartridge containing vaporizable material, a battery, a vaporization circuit electrically connected to the battery, the vaporization circuit configured to provide power from the battery to a heating element, wherein the heating element is configured to vaporize the vaporizable material, and an authentication circuit electrically connected to the battery, the authentication circuit configured to interface with an identification circuit in the cartridge and determine an authenticity of the cartridge as a function of the identification circuit.

15 Claims, 6 Drawing Sheets

CARTRIDGE-ACCEPTING DEVICE WITH AN AUTHENTICATION CIRCUIT

CROSS-REFERENCE TO RELATED APPLICATIONS

This application claims the benefit of priority of U.S. Provisional Patent Application Ser. No. 62/929,747 filed on Nov. 1, 2019, and titled "Device and Method for Component Deactivation Based on Location Beacon Proximity or Authentication," which is incorporated by reference herein in its entirety.

FIELD OF THE INVENTION

The present invention generally relates to the field of vaporization devices. In particular, the present invention is directed to a cartridge-accepting device with an authentication circuit.

BACKGROUND

Vaporization devices have become ubiquitous, due to their ease of use, relative inoffensiveness, and various interchangeable flavors. However, the use of these devices has become epidemic in schools and other locations where use is not appropriate. To make matters worse, creation of bootleg ingredients has exploded, introducing potentially harmful or even toxic elements into purportedly safe products.

SUMMARY OF THE DISCLOSURE

In an aspect, a self-authenticating cartridge-accepting device includes a cartridge receptacle adapted to accept a cartridge containing vaporizable material, a battery, a vaporization circuit electrically connected to the battery, the vaporization circuit configured to provide power from the battery to a heating element, wherein the heating element is configured to vaporize the vaporizable material, and an authentication circuit electrically connected to the battery, the authentication circuit configured to interface with an identification circuit in the cartridge and determine an authenticity of the cartridge as a function of the identification circuit.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
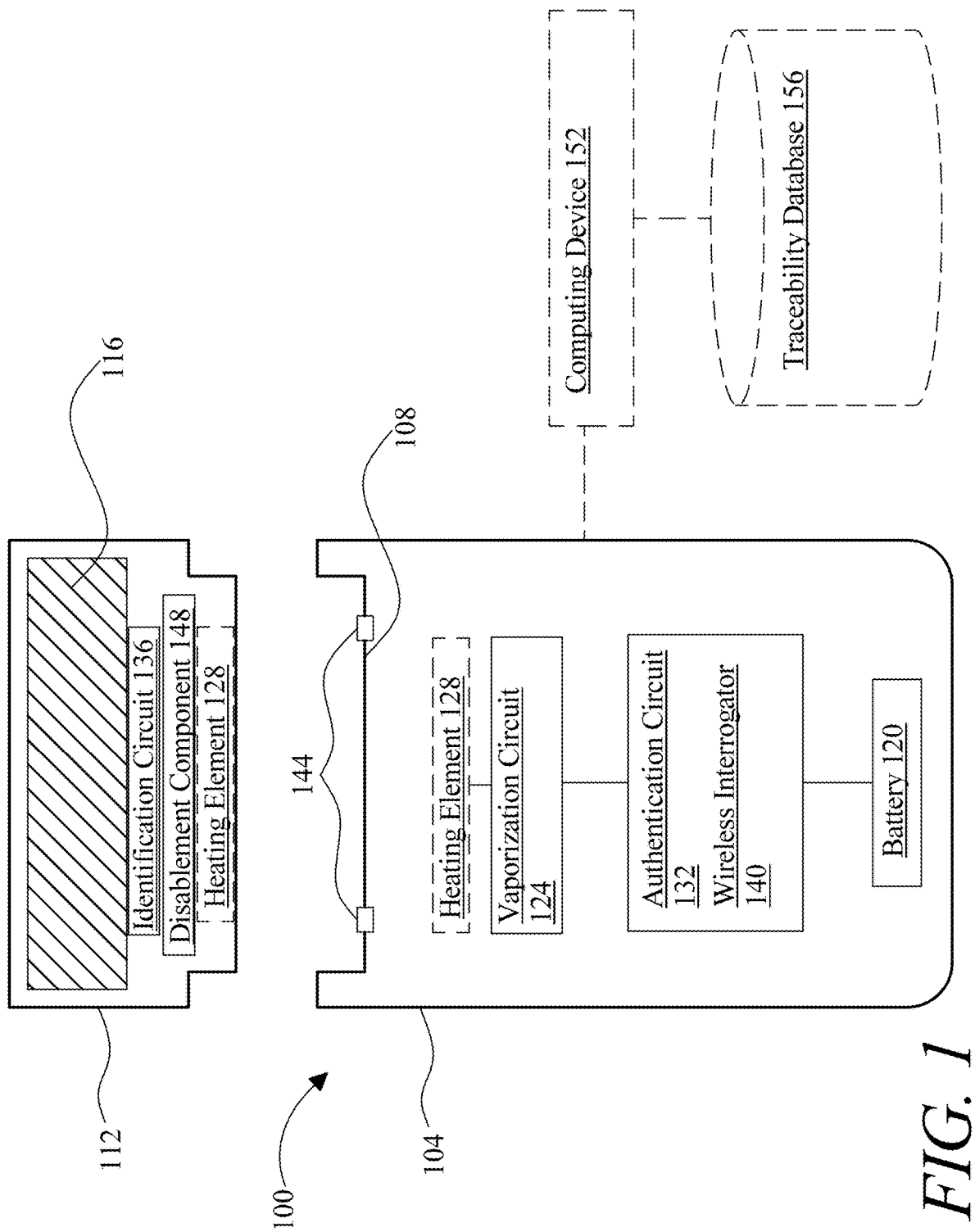
FIG. 1 is a block diagram illustrating an exemplary embodiment of a self-authenticating cartridge-accepting device.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments of a vaporization device as disclosed herein perform self-authentication and/or authentication of cartridges to ensure safety, prevent reuse of single-use items, and associate authentication of devices and/or cartridges with their supply chain history. In an embodiment, authentication of a device, its components, and/or cartridges may advantageously prevent prohibited or undesirable activity in certain areas, verify the authenticity of the supply chain to ensure quality, and/or enable tracking by a government entity or the manufacturer of device or cartridge usage. Component validation mechanisms may be deployed, with anonymous device authentication and/or authentication that may be traced to a particular user.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithms may demonstrate an "avalanche effect," whereby even extremely small changes to a lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may be used to detect collision on the order of $O(2^{n/2})$ for n output bits; thus, it may take on the order of $2^{256}$ operations to locate a collision in a 512 bit output. "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies on prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided elements of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Figure 2:
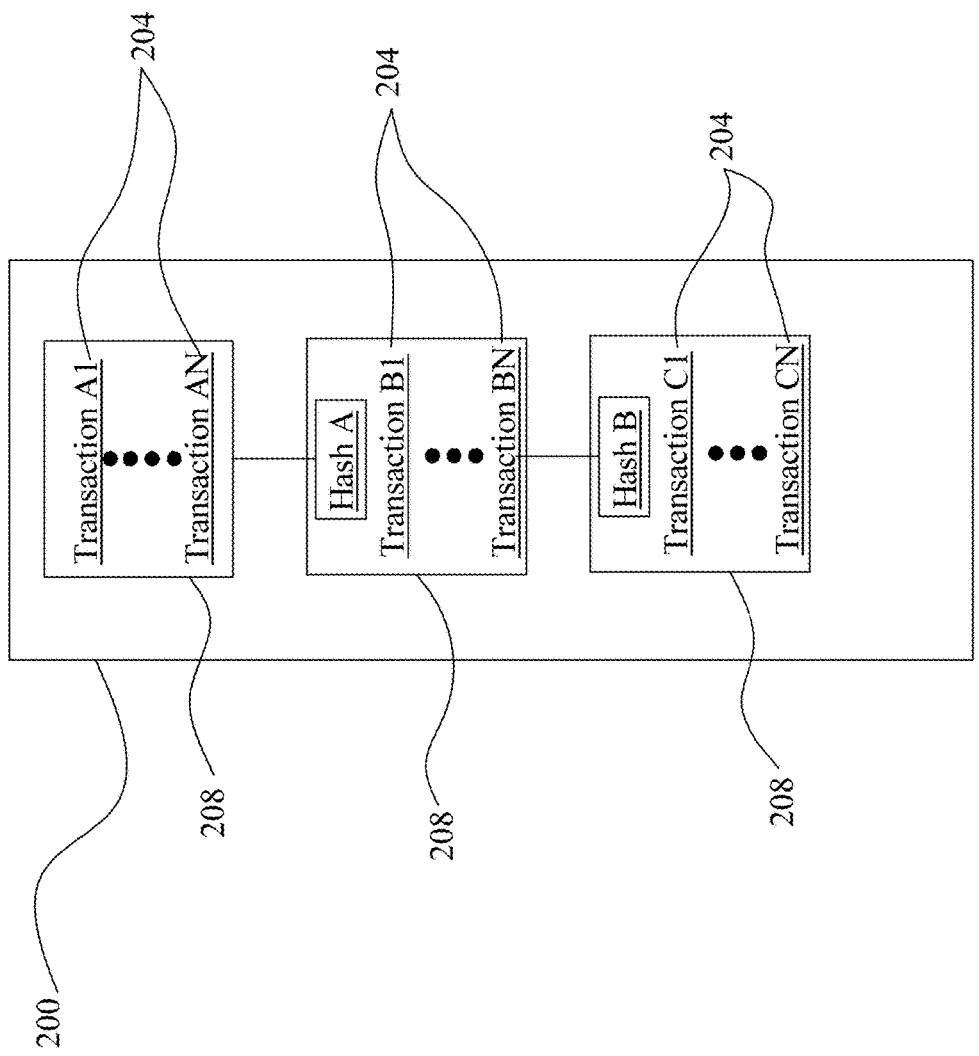
FIG. 2 is a block diagram illustrating an exemplary embodiment of an immutable sequential listing.

Still viewing FIG. 2, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 2, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring to FIG. 1, a block diagram illustrating an exemplary embodiment of a self-authenticating cartridge-accepting device 100 is illustrated. Cartridge-accepting device 100 may include a housing 104. A housing 104 may be constructed of any suitable material and/or combination of materials, wood, leather, injection molded plastics like high-density polyethylene (HDPE) or Acrylonitrile butadiene styrene (ABS), stamped or otherwise machined metal like aluminum, steel alloys, tin, or other alloys, and/or any other material or combinations of materials suitable for construction of a housing 104 of a vaporization device as described herein. In embodiments, a housing 104 may, in a hollow space within, enclose or encase one or more additional elements of cartridge-accepting device 100, for instance and without limitation as described in further detail below.

Still referring to FIG. 1, cartridge-accepting device 100 includes a cartridge 112 receptacle 108 adapted to accept a cartridge 112 containing vaporizable material 116. A housing 104 of a cartridge-accepting device 100 may further include a cartridge 112 receptacle 108 for receiving a cartridge 112; the cartridge 112 receptacle 108 may be shaped to receive an opened cartridge 112 or "pod". A cartridge 112 may be opened when a protective cap is removed from a surface of the cartridge 112. In some cases, a cartridge 112 may be opened when a hole or opening is formed on a surface of the cartridge 112. A pod may be inserted into an open end of a cartridge 112 receptacle 108 so that as a non-limiting example, exposed contact tips of the pod make contact with contacts of a vaporizable device housing 104, thus forming an assembled vaporizing device.

Further referring to FIG. 1, a vaporizable material 116 may be contained in a cartridge 112 or the vaporizable material 116 may be loosely placed in one or more cavities in cartridge-accepting device 100. Vaporizable material 116 may include one or more flavors and/or active ingredients. Vaporizable material 116 may include a humectant, wherein "humectant" may generally refer to as a substance that is used to keep things moist. A humectant may attract and retain moisture in the air by absorption, allowing the water to be used by other substances. Humectants are also commonly used in many tobaccos or botanicals and electronic vaporization products to keep products moist and as vapor-forming medium. Examples include propylene glycol, sugar polyols such as glycerol, glycerin, and honey. In embodiments, vaporizable material 116 may include combustible ingredients such as, for example, tobacco leaves and/or cannabis flowers. These combustible ingredients may have undergone one or more processing techniques, such as, for example, drying, grinding, sheeting, reforming, folding, or any combination thereof, Continuing to refer to FIG. 1, cartridge-accepting device 100 includes a battery 120. Battery 120 may include one or more battery elements in parallel and/or series configured to provide power components of cartridge-accepting device 100. For example, battery 120 may include one or more lithium-ion batteries, alkaline batteries, lead-acid batteries, aluminum-ion batteries, flow batteries, magnesium-ion batteries, metal-air electrochemical cells, nickel-ion batteries, zinc-ion batteries, or any combination thereof, to name a few. According to embodiments, battery 120 may include an alternative power source such as an alternating current ("AC") power source, direct current ("DC") power source, power over ethernet (PoE), a solar photovoltaic cell, a wind turbine, or any combination thereof, and/or power electronics such as a half-bridge rectifier, full-bridge rectifier, inverter, maximum-point power tracker, power converter (such as a buck converter, boost converter, buck-boost converter, flyback converter, transformer, etc.), or any combination thereof, to name a few. According to embodiments, battery 120 may be configured to provide power to one or more elements of cartridge-accepting device 100 as described in further detail below. This may be accomplished using power management circuitry including, for example, a power microcontroller, switches, relays, transistors, linear regulators, power converters, or any combination thereof, to name a few.

With continued reference to FIG. 1, cartridge-accepting device 100 includes a vaporization circuit 124 electrically connected to the battery 120. Vaporization circuit 124 is configured to provide power from the battery 120 to a heating element 128, wherein the heating element 128 is configured to vaporize the vaporizable material 116, for instance and without limitation using an atomizer, cartomizer or the like. Heating element 128 may be incorporated in cartridge-accepting device 100 and/or in cartridge 112. Vaporization circuit 124 may be closed only upon connection with heating element 128 and/or insertion of cartridge 112. Vaporization circuit 124 and/or other circuitry of cartridge-accepting device 100 may include one or more circuit elements providing and/or regulating electrical power from a power source to a heating element 128, including without limitation a microcontroller, a resistance measurement circuit connected to a microcontroller configured to measure the resistance of the resistive heater a sensor such as a heat sensor, a target resistance circuit configured to determine a target resistance, or the like.

Still referring to FIG. 1, a cartridge-accepting device 100 may include and/or incorporate heating element 128 in an "atomizer" or "cartomizer" configured to heat an aerosol forming solution (e.g., vaporizable material 116). An aerosol-forming solution may comprise glycerin and/or propylene glycol. Vaporizable material 116 may be heated to a sufficient temperature to vaporize. An atomizer may be a device or system configured to generate an aerosol. An atomizer may include, without limitation, a small heating element 128 that heats and/or vaporizes at least a portion of a vaporizable material 116 and a wicking material that may draw a liquid vaporizable material 116 in to the atomizer; a wicking material may comprise silica fibers, cotton, ceramic, hemp, stainless steel mesh, and/or rope cables. A wicking material may be designed and/or configured to draw liquid vaporizable material 116 into an atomizer without a pump or other mechanical moving part. A resistance wire may be wrapped around a wicking material and then connected to a positive and negative pole of a current source such as a power source as noted above; a resistance wire may include, without limitation, a coil, and when activated may have a temperature increase as a result of the current flowing through the resistive wire to generate heat. Heat may be transferred from a heating element 128 to at least a portion of a vaporizable material 116 through conductive, convective, and/or radiative heat transfer such that at least a portion of the vaporizable material 116 vaporizes.

Continuing to refer to FIG. 1, as an alternative or additional element to the atomizer, a cartridge-accepting device 100 may include a "cartomizer" to generate an aerosol from vaporizable material 116 for inhalation by a user. A cartomizer may include a cartridge 112 and an atomizer. A cartomizer may have a heating element 128 surrounded by a liquid-soaked poly-foam that acts as holder for a vaporizable material 116, which may include without limitation a liquid. Cartridge-accepting device 100 may not have an atomizer or cartomizer, but may include an oven instead, which may be at least partially closed. An oven may have a closable opening. An oven may be wrapped with a heating element 128 or may be in thermal communication with a heating element 128 by means of another mechanism. A vaporizable material 116 may be placed directly in an oven or in a cartridge 112 fitted in the oven. A heating element 128 in thermal communication with the oven may heat a vaporizable material 116 mass in order to create a gas phase vapor, including without limitation through conductive, convective, and/or radiative heat transfer. Vapor may be released to a vaporization chamber where gas phase vapor may condense, forming an aerosol cloud having typical liquid vapor particles with particles having a diameter of average mass of approximately 1 micron or greater. In some cases, the diameter of average mass may be approximately 0.1-1 micron.

Still referring to FIG. 1, air may be drawn into a cartridge-accepting device 100 to carry the vaporized aerosol away from the heating element 128, where it may then cool and condense to form liquid particles suspended in air, which may then be drawn out of a mouthpiece by a user. Vaporization of at least a portion of a vaporizable material 116 may occur at lower temperatures in the cartridge-accepting device 100 compared to temperatures required to generate an inhalable vapor in a cigarette. A cigarette may be a device in which a smokable material is burned to generate an inhalable vapor. A lower temperature of a cartridge-accepting device 100 may result in less decomposition and/or reaction of vaporized material.

Continuing to refer to FIG. 1, cartridge-accepting device 100 and/or cartridge 112 may include a mouthpiece (not shown) located at one end. A mouthpiece may be an element of a cartridge-accepting device 100 through which a user inhales vapor, as described above. A mouthpiece may include an aperture through which vapor is drawn when a user inhales, a passage through which vapor passes to the aperture, one or more inlets to permit passage of air through the mouthpiece, and/or any other suitable feature. A mouthpiece may be tapered or otherwise shaped to fit in a user's mouth with ease and comfort.

Still referring to FIG. 1, cartridge-accepting device 100 includes an authentication circuit 132 electrically connected to the battery 120. Authentication circuit 132 may include any suitable combination of digital and/or analog elements, including without limitation an application-specific integrated circuit (ASIC), field-programmable gate array (FPGA), microprocessor, microcontroller, or other sequential and/or combinatorial logic circuit programmed and/or configured to perform processes as described in further detail below. Authentication circuit 132 is configured to interface with an identification circuit 136 in the cartridge 112, where "interfacing" as used in this context refers to transmission of data to identification circuit 136 and/or reception of data from identification circuit 136. Data may include, without limitation, an identifier of cartridge 112. Identifier may include, without limitation, any textual and/or binary data suitable for use as a value that may be associated with an object. Identifier may be unique, either by means of checking within system and/or a database to ensure that no identical identifier exists within system prior to assigning identifier to cartridge 112, and/or using statistically unique identification protocols such as globally unique identifier (GUID) and/or universally unique identifier (UUID) protocols. Identifier may be provided in the form of a digital signature as described above, a serial number, or the like. Identifier may be encoded by barcode, quick read (QR) code, imbedded permanent or temporary device key, device public key, silicon based digital-fingerprint and/or low-level keys. A digital signature may include hashed, random, and/or encrypted elements, for instance and without limitation as described above.

Further referring to FIG. 1, authentication circuit 132 may include a wireless interrogator 140; in other words, an antenna of authentication circuit 132 may be capable of inducing a current in an antenna of a passive transmitter, such as a passive transmitter included in identification circuit 136, through magnetic coupling, capacitive coupling, or other means. Authentication circuit 132 may be able to receive the signal transmitted by identification circuit 136 using an antenna. In some embodiments, the authentication circuit 132 can transmit as well as receive signals. Authentication circuit 132 may include a transceiver, which both sends and receives signals; the transceiver may be a system on a chip, including processing, memory, or any other functions together in a single integrated circuit. Transceiver may exchange signals according to existing protocols, such as the BLUETOOTH protocol promulgated by Bluetooth SIG, Inc. of Kirkland, Wash. Transceiver 112 may further implement a "beacon" protocol; as a non-limiting example, the beacon protocol may be implemented using the IBEACON protocol produced by Apple, Inc. of Cupertino, California, the EDDYSTONE protocol produced by Google, Inc. of Mountain View, Calif., or a similar protocol. Antenna may include a plurality of antennas; for example, and without limitation, an antenna may include a first antenna that transmits interrogation signal, and a second antenna that receives return signal. Antenna may include multiple antennas that receive and/or transmit signals; for instance, antenna may include antennas facing in various directions for transmitting interrogation signals and receiving return signals to and from various directions simultaneously. Similarly, authentication circuit 132 may include both an antenna for receiving from and/or transmitting signals to a transmitter and a transceiver that may be used for communicating with a mobile computing device 152, for instance as described below.

Continuing to refer to FIG. 1, authentication circuit 132 may include a pair of electrical contacts 148 configured to supply an electrical current to the cartridge 112. Contacts may include, for instance, strips, tabs, projections, and/or recesses made from electrically conducting material that, when cartridge 112 is inserted into cartridge 112 receptacle 108, are brought into contact with corresponding electrically conducting contacts connected to circuitry of cartridge 112, including without limitation identification circuit 136. Where heating element 128 is in cartridge 112, a pair of electrical contacts 148 may be further configured to provide electrical power to the heating element 128. In other words, power may be supplied to a heating element 128 in cartridge 112 using the same contacts for transmission of an identifier of cartridge 112 by identification circuit 136 to authentication circuit 132; alternatively or additionally, signals and power may be transmitted using distinct contacts.

Still referring to FIG. 1, identification circuit 136 may include any passive and/or active wireless communication components as described above, and/or may include a circuit that receives electrical signals by way of electrical contacts 148 as described above. Identification circuit 136 may include a disablement component, defined for the purposes of this disclosure as a component configured to disable the identification circuit 136 during use of cartridge 112. "Disablement," as used in this disclosure, includes any process for alteration of function of identification circuit 136 in such a way as to prevent it from outputting an identifier and/or to cause it to output an altered identifier; this may, for instance, cause authentication of cartridge 112 to fail. As a non-limiting example, disabling component may be permanently altered by application of heat, to which the component may be exposed by heat from heating element 128; for instance, disabling component may include a dielectric element that melts to generate a short, disable a capacitor or the like, and/or a conducting element that burns and/or melts. As a further non-limiting example, disabling component may be permanently altered by electrical current generated by vaporization circuit 124, such as a one-time fuse or the like. As an additional non-limiting example, disabling component may be configured to alter a stored identifier, such as an identifier stored on identification circuit 136, during use; this may be accomplished by overwriting a stored identifier with a randomly generated identifier and/or with an identifier associated in a system implementing methods described herein with used cartridge 112. In a further non-limiting example, disabling component may include an element that is physically altered by extraction, such as a puncture element that damages a portion of the identifier circuit during extraction, using barbs, hooks, or the like. In an embodiment, the disabling component may act to enforce one-time use of cartridge 112, by preventing use of cartridge 112 after first use, and/or by permitting authentication circuit 132 to detect that cartridge 112 has been used.

Still referring to FIG. 1, in some embodiments, authentication circuit 132 and/or identification circuit 136 may transmit an indication that a cartridge 112 associated with identifier is being used to a computing device 152, which may update one or more data records to indicate that cartridge 112 has been used. Computing device 152 may include any computing device 152 as described in this disclosure, including without limitation a microcontroller, microprocessor, digital signal processor (DSP) and/or system on a chip (SoC) as described in this disclosure. Computing device 152 may include, be included in, and/or communicate with a mobile device such as a mobile telephone or smartphone; mobile device may be operated by user, and/or may access datastores, databases, and/or data structures as described in further detail below remotely at additional devices. Computing device 152 may include a single computing device 152 operating independently, or may include two or more computing device 152 operating in concert, in parallel, sequentially or the like; two or more computing devices 152 may be included together in a single computing device 152 or in two or more computing devices 152. Computing device 152 may interface or communicate with one or more additional devices as described below in further detail via a network interface device. Network interface device may be utilized for connecting computing device 152 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 152, and any combinations thereof. A network may employ a wired and/or a wireless mode of communication. In general, any network topology may be used. Information (e.g., data, software etc.) may be communicated to and/or from a computer and/or a computing device 152. Computing device 152 may include but is not limited to, for example, a computing device 152 or cluster of computing devices 152 in a first location and a second computing device 152 or cluster of computing devices 152 in a second location. Computing device 152 may include one or more computing devices 152s dedicated to data storage, security, distribution of traffic for load balancing, and the like. Computing device 152 may distribute one or more computing tasks as described below across a plurality of computing devices 152 of computing device 152, which may operate in parallel, in series, redundantly, or in any other manner used for distribution of tasks or memory between computing devices 152. Computing device 152 may be implemented using a "shared nothing" architecture in which data is cached at the worker, in an embodiment, this may enable scalability of system 100 and/or computing device 152.

Computing device 152 may be designed and/or configured to perform any method, method step, or sequence of method steps in any embodiment described in this disclosure, in any order and with any degree of repetition. For instance, computing device 152 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 152 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, cartridge-accepting device 100 may be configured to determine an authenticity of the cartridge 112 as a function of the identification circuit 136. As used in this disclosure, a cartridge 112 that has been successfully authenticated is a cartridge 112 for which a determination has been made that the cartridge 112 is unused, associated with a valid supply chain or manufacturing record, is not counterfeit, and has not been identified as tampered with or otherwise inauthentic. In an embodiment, authentication circuit 132 may be configured to receive an identifier from the identification circuit 136, for instance and without limitation as described above. Authentication circuit 132 may be configured to transmit the identifier to a computing device 152 as described above. Authentication circuit 132 may receive an authentication signal from the computing device 152, where an authentication signal indicates a stored status regarding identifier, including a status indicating previous use and/or supply chain authenticity. Supply chain authenticity of a device or component may be performed by comparing its identifier to a traceability database 156, which may be maintained by a manufacturer, a government agency, a consumer organization, a health-oriented organization, a safety organization, or the like. Traceability database 156 may be implemented, without limitation, as a relational traceability database 156, a key-value retrieval traceability database 156 such as a NOSQL traceability database 156, or any other format or structure for use as a traceability database 156 that a person skilled in the art would recognize as suitable upon review of the entirety of this disclosure. Traceability database 156 may alternatively or additionally be implemented using a distributed data storage protocol and/or data structure, such as a distributed hash table or the like. Traceability database 156 may include a plurality of data entries and/or records as described above. Data entries in a traceability database 156 may be flagged with or linked to one or more additional elements of information, which may be reflected in data entry cells and/or in linked tables such as tables related by one or more indices in a relational traceability database 156. Persons skilled in the art, upon reviewing the entirety of this disclosure, will be aware of various ways in which data entries in a traceability database 156 may store, retrieve, organize, and/or reflect data and/or records as used herein, as well as categories and/or populations of data consistently with this disclosure. Traceability database 156 may be implemented in any localized and/or distributed storage, including cloud-based storage, storage in an immutable sequential listing such as a blockchain, hash chain, and/or other cryptographically secured immutable form, or the like. Communication with computing device 152 and/or traceability database 156 may be encrypted. The device or cartridge 112 may communicate via WiFi, Bluetooth, Bluetooth-low-energy, mesh (e.g. Bluetooth mesh or Zigbee), RF point-to-multipoint (e.g. LoRaWan), Cellular (e.g. 4G LTE, 5G) Cellular IoT (e.g. NB-Iot, Cat-M), Radar, Ultrasonic, Ultra Wideband or other similar communication method computing device 152. A component may communicate directly to the database, or indirectly through computing device 152. Alternatively or additionally, a data record relating to the identifier may exist and may indicate whether it has been used and/or is blacklisted or the like. In an embodiment, authentication of devices and/or components may be implemented with a registry, for instance as stored in a traceability database, to verify a user, device, and/or component such as cartridge 112. Authentication may serve to protect against counterfeit products and/or to ensure that a user is authorized based on their access level, age, or other characteristics; user data may be stored in the traceability database, in computing device 152, or the like. Anti-defeat features may be used to ensure mechanisms are not disabled, including any tamper-resistant features, tamper evident features, or the like as described in further detail below. Cartridge-accepting device 100 may include, without limitation, a vaping device, an electronic nicotine delivery system (ENDS), or electronic non-nicotine delivery system (ENNDS) or the like.

Further referring to FIG. 1, traceability database 156 may include, for cartridge-accepting device 100, cartridge 112, and/or other related elements such as device refills or separately sold vaporizable material, fields and/or records to record any or all of manufacturer identification and/or other data. Manufacturer identification and/or other data may include date of manufacture of device 100, cartridge 112, and/or other related element, a device key as described below of a device 100, cartridge 112, and/or other related element, a serial number as described below of a device 100, cartridge 112, and/or other related element, a registration date on which one or more of device 100, cartridge 112, and/or other related element has been registered as purchased, manufactured, and/or otherwise recorded at some point on a supply chain, one or more verification dates at which authentication, verification, or the like have taken place, one or more locations at which sale, use, authentication or the like of device 100, cartridge 112, and/or other related element have taken place, and/or one or more users that have purchased, sold, used, authenticated, and/or otherwise interacted with device, computing device 152, or the like.

As a non-limiting example, and still referring to FIG. 1, authentication may be recorded once in traceability database 156 for single use components or devices. Once a cartridge 112 is removed from device, authentication circuit 132 may fail component on subsequent insertions, for instance and without limitation by receiving an indication from traceability database 156 and/or computing device 152 and/or by operation of a disability component as described above. Alternatively, cartridge 112 may be permitted to be activated a limited number, or an unlimited number, of times. In another embodiment, cartridge 112 may be permitted to be activated on a certain number of devices, and/or a limited number of times with each device; for instance, activation may be permitted on up to two devices, and up to five times with each device. Either cartridge 112 or cartridge-receiving device 100 may be required to re-authenticate on a periodic basis, such as every use, every ten uses, hourly, daily, weekly, or monthly. Re-authentication may be manually initiated with a button on the device, in an application on an associated electronic device, by powering up device, and/or by insertion of a cartridge 112 in device. Device and/or cartridge 112 may include a meter to gauge a rate of use; meter may be incorporated in and/or communicatively connected to authentication circuit 132. A rate of use may be referenced against a number of activations to confirm expected usage rate. Cartridge-accepting device 100 and/or cartridge 112 may include a meter to gauge the rate of use. A rate of use may be referenced against a number of activations of device 100 as compared to and/or associated with an e-liquid and/or vaporizable material 116 level to confirm an expected depletion rate.

With continued reference to FIG. 1, authentication circuit 132 may be configured to compare identifier to a plurality of valid identifiers stored in memory of the authentication circuit 132. Valid identifiers may be compared remotely on computing device 152 and/or traceability database 156; alternatively or additionally, a lot of valid identifiers may be retrieved, by authentication circuit 132, from computing device 152 and/or traceability database 156, upon receipt of a lot identifier. Lot identifier may be received by scanning a QR, UPC, RFID, or other code associated with a lot such as a package of cartridge 112s or the like, and/or manual entry thereof on computing device 152 or the like. Authentication circuit 132 may be configured to query a listing of blacklisted identifiers and determine whether the identifier is a blacklisted identifier as a function of the querying. List of blacklisted identifiers may be received by authentication circuit 132 according to any method process and/or process step described in this disclosure. Alternatively or additionally, querying may include transmission of identifier to a computing device 152, which may query the listing remotely and transmit results of the querying and/or an authentication decision based on the querying to the authentication circuit 132.

Still referring to FIG. 1, in an alternative embodiment, a person may enter an identifier associated with cartridge 112 and/or a data input on computing device 152 to authenticate the cartridge 112. In a non-limiting example, identifier may be provided by a seller of cartridge 112, printed on cartridge 112 and/or packaging thereof, or the like. Identifier may alternatively or additionally be received by scanning a QR, UPC, RFID, or other code associated with cartridge 112, printed on and/or appended to cartridge 112, packaging thereof, and/or material provided therewith, or the like.

With continued reference to FIG. 1, authentication circuit 132 may be configured to perform one or more actions based on a determination of authenticity. For instance, and without limitation, authentication circuit 132 may be configured to activate an indicator light upon determining authenticity of a cartridge 112; indicator light may include one or more light-emitting diodes (LEDs) or the like. In an embodiment, a first color, pattern of blinks, and/or number of indicator lights may indicate that a cartridge 112 is authentic, while a second color, pattern of blinks, and/or number of indicator lights may indicate that authentication has failed. Alternatively or additionally, authentication circuit 132 may be configured to display on a display device of cartridge-receiving device and/or transmit to computing device 152 a message as a function of determining authenticity of a cartridge 112. Message may state whether authentication has succeeded or failed; in the case of failure, message may indicate a reason for failure, such as identification of a bootleg or counterfeit cartridge 112, indication of cartridge 112 that is blacklisted and/or a reason for blacklist, and/or indication that the cartridge 112 has been used more than a maximal permitted number of times. Alerts may alternatively or additionally include an audible sound, vibration, or the like. Messages may be transmitted using a messaging system directly (including but not limited to SMS or email) and/or using a messaging system on an associated electronic device.

Still referring to FIG. 1, in some embodiments, authentication circuit 132 may be configured to disable vaporization circuit 124, preventing use of device for vaporization and inhalation of vaporizable material 116. Authentication circuit 132 may accomplish this by controlling power from battery 120 to vaporization circuit 124, for instance by controlling one or more circuit elements governing power distribution from the battery 120, such as a power MOSFET or other transistor or switch. Alternatively or additionally, authentication circuit 132 and/or a portion thereof may be integrated within a battery 120 of device; in an embodiment, cartridge-accepting device 100 may only be able to operate if the battery 120 is verified, and able to provide power. In another embodiment, authentication circuit 132 or a portion thereof may be located between the battery 120 and the operating electronics of charge-accepting device. For instance, and without limitation, authentication circuit 132 may be configured to determine that the cartridge 112 is not authentic and disable vaporization circuit 124. Cartridge-receiving device may be physically or electronically deactivated as a result if authentication fails because of inconsistent or incorrect inputs.

With continued reference to FIG. 1, authentication circuit 132 may perform situation and/or location-dependent authentication. As a non-limiting example, cartridge-accepting device 100 may be limited in use and/or deactivated based on proximity to a restricted area as defined by beacon transmission, a virtual beacon implemented with geo-fencing, or based on the authenticity of device components. For instance, authentication circuit 132 may be configured to receive a local wireless signal and disable the vaporization circuit 124 as a function of the local wireless signal. One or more beacons, which may include any localized wireless signal source, including without limitation any beacon protocol as described in this disclosure, may be deployed at a location where use of a device such as cartridge-accepting device 100 is prohibited or undesirable. As a non-limiting example, areas designated as a vape-free zone may contain one or more beacons to limit use or prohibit the use of such devices. A beacon may be deployed using designated radio frequencies, Bluetooth, Bluetooth low-energy, active RFID, or other short-range or long-range communications, in order to disable a device in proximity to the beacon. A transmitter of a beacon may be either stand-alone or integrated within another device. In one embodiment, cartridge-accepting device 100, when in proximity to beacons deployed in a vape-free zone, may be disabled and transmitter may be integrated with a vape-detection system, detection node, repeater node, or communication hub. In another embodiment, a vaping device in proximity to beacons deployed in a vape-free zone is disabled and the transmitter is stand-alone. Vape-detection systems, vape-detection nodes, and the like may be implemented, without limitation, as described in U.S. Nonprovisional application Ser. No. 17/001,994, filed on Aug. 25, 2020, and entitled "SYSTEM AND METHOD FOR DETECTION OF VAPORIZED AEROSOLS," U.S. Nonprovisional application Ser. No. 17/072,892, filed on Oct. 16, 2020, and entitled "VAPORIZED AEROSOL DETECTION NETWORK," each of which is incorporated by reference herein in its entirety.

Still referring to FIG. 1, authentication circuit 132 may include and/or communicate with a beacon receiver, which may include any receiver as described in this disclosure. In some embodiments, a receiver may be included as part of the battery 120 to prevent power delivery to the device. In operation, if the receiver detects a beacon frequency or frequencies, authentication circuit 132 may prevent activation of the device. As a non-limiting example, an active RFID tag may transmit a code that is recognized as a signal to prevent activation; the code may be transmitted to another associated electronic device. As a further non-limiting example, a BLUETOOTH beacon may transmit a code to the device to prevent activation. Other types of communication technology commonly recognized by someone familiar in the art may be used. A beacon may transmit on multiple frequencies to avoid jamming.

Alternatively or additionally, and with continued reference to FIG. 1, location may be determined using a "virtual beacon" technology. Device may be prevented, for instance by authentication circuit 132, from operating within geo-fenced regions, detected using any location-detection means such as without limitation global positioning systems (GPS) or other satellite-based systems, cell-tower triangulation, proximity to signal sources having known locations, or the like, where use of the device is prohibited or undesired. Location detection and/or comparison to geo-fences may be performed on cartridge-accepting device 100 and/or on an adjacent computing device 152 such as a computing device 152 operated by a user of cartridge-accepting device 100. A database such as traceability database 156 may track and/or identify disallowed geofenced zones; a database may be curated, automatically created based on existing map labels, and/or a combination of both. In an embodiment, a database may be downloaded to device and/or a computing device 152 operated by a user of cartridge-accepting device 100, or partially downloaded based on region and/or frequently visited locations. In an embodiment, if verification with regard to geo-fences has not taken place, authentication circuit 132 may prevent device from activating. Certificate authorities and/or encryption may be used to avoid spoofing, a substitution attack, or similar attempt to defeat the system.

In an embodiment, and still referring to FIG. 1, if a user attempts to use cartridge-accepting device 100 within a prohibited area, cartridge-accepting device 100 may notify the user using any notification components and/or methods as described above, including without limitation an audible sound, vibration, light indicator, activation to a messaging system directly (including but not limited to SMS or email) and/or using a messaging system on an associated electronic device. Messages may include content directed to the device owner, content directed to another person, a message to the owner or tenant at the proximate location, manufacturer notification, or government agency notification. Messages may include, without limitation, an identity of the user, identity of a cartridge-accepting device 100, an identity of other components on the device, and/or location of attempted use. In addition, other related messages may be delivered, a local messaging service may be activated such as a banner, electronic sign, or other auditory or visual notification on the device, to a connected device, or in the general location of the attempted use. Messages may be sent to a proximate school, workplace, or other institution and/or authority. In a non-limiting example, notifications may be performed instead of disabling vaporization circuit 124 and/or cartridge-accepting device 100.

As a further example, and with further reference to FIG. 1, such as for methods of authentication that involve communication with a computing device 152, authentication circuit 132 may be configured not to function if the authentication circuit 132 is not communicatively connected to a computing device 152; for instance, and without limitation, authentication circuit 132 may disable verification circuit and/or other components of cartridge-accepting device 100 using any process and/or component described above. Authentication circuit 132 and/or cartridge-accepting device 100 may alternatively or additionally generate alerts and/or notifications as described above. In a non-limiting example, notifications may be performed instead of disabling vaporization circuit 124 and/or cartridge-accepting device 100.

With continued reference to FIG. 1, authentication may be started and/or initiated by activation of cartridge-accepting device 100; in other words, a user may attempt to commence use of device 100 using a button or other power switch or the like, which may trigger authentication prior to and/or concurrently with commencement of use, vaporization, or the like. Alternatively or additionally, authentication circuit may detect insertion of a cartridge and initiate authentication upon detection, for instance by detection using a wireless interrogator 140, detection of electrical connection to electrical connectors 144, and/or displacement of and/or triggering of a physically actuated switch, a magnetically actuated switch, or the like. It should also be noted that cartridge may be a temporary and/or permanent component of a device. In other words, cartridge-accepting device may include a disposable device and/or a device that refills a reservoir, which may be included in the definition of a "cartridge" for purposes herein, from another source rather than by cartridge replacement.

In an embodiment, and still referring to FIG. 1, authentication circuit 132 may perform a one-time authentication of a cartridge 112 and continue to permit use of the cartridge 112 until the cartridge 112 is ejected. In other words, authentication circuit 132 may be configured to determine that the cartridge 112 is authenticated and transition to an authenticated state as a function of the determination. This may be implemented, without limitation, using a state of a finite state machine (FSM) within the authentication circuit 132. A cartridge-accepting device 100 in authenticated mode may still disable while in contact and/or communication with a wireless signal, upon a check to a blacklist, or the like. For instance, each activation of a device, whether cartridge 112 has been changed or not, may trigger a query to traceability database 156, blacklists, or the like to ensure no recalls or reports regarding a currently used cartridge 112 have issued. Authentication circuit 132 may be configured to transition into a non-authenticated state, in which use of vaporization circuit 124 is prevented and/or lights and/or messages indicate that authentication has not yet occurred, under one or more circumstances. For instance, authentication circuit 132 may be configured to detect extraction of the cartridge 112 and transition to a non-authenticated state as a function of the detection. Detection of ejection may be detected by detection of loss of electrical contact, movement of a physically activated switch displaced by cartridge 112, loss or weakening of a wireless signal from cartridge 112, or the like.

Still referring to FIG. 1, cartridge-accepting device 100 and/or device may integrate a capability of testing for quality elements in a component. Alternatively, device or cartridge 112 may be required to be tested in portable or fixed location testing equipment for quality, within the supply chain, immediately before delivery of the device to the consumer, or after delivery of the device to the consumer. Test results may be recorded in traceability database 156 and/or used as part of an activation process, or with continued use of the device or component.

Further referring to FIG. 1, cartridge-accepting device 100 may integrate one or more components for testing of elements and/or ingredients within vaporizable material 116 and/or vapor generated therefrom; such devices may include one or more chemical sensors such as volatile organic compound (VOC) sensors, mobile spectrographic devices, or the like. Alternatively or additionally, a device and/or cartridge 112 may be required to be tested in a portable or fixed location spectrometer or chemical sensor for quality.

In some embodiments, and further referring to FIG. 1, devices and components may be physically marked with a serial number or identified with an RFID tag. Identifier used by authentication circuit 132 may include an identifier that is not stamped on the outside of the device. The serial number and/or key may be non-sequential, random, and/or pseudorandom, and/or may include a cryptographic hash and/or one or more encrypted, random and/or coded elements. To verify authenticity of a device and/or cartridge 112 or lot of cartridge 112s, exterior serial number and/or key may be compared, singly and/or in combination with an identifier as described above, with a record in traceability database 156. If a serial number and/or identifier doesn't exist, or the serial number and/or identifier has already been activated, this indicates a counterfeit product. In some embodiments, cartridge 112 may include serial number and/or key. Device 100 may include serial number and/or key. Battery 120 may include serial number and/or key. In some embodiments, a user may alternatively or additionally enter one or more of serial number, key, and/or identifier manually on device 100 and/or a computing device 152, and/or by scanning QR, bar, and/or RFID codes.

Still referring to FIG. 1, to prevent tampering with cartridge-accepting device 100 to bypass countermeasures, in one embodiment, hardware inside the device and/or cartridge 112 may be encapsulated or potted in epoxy or similar material that is difficult to remove.

As noted above, traceability database 156 may be implemented as and/or stored on an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may include and/or implement an immutable ledger, where data entries that have been posted to the immutable sequential listing cannot be altered.

Referring now to FIG. 2, an exemplary embodiment of an immutable sequential listing 200 is illustrated. Data elements are listed in immutable sequential listing 200; data elements may include any form of data, including textual data, image data, encrypted data, cryptographically hashed data, and the like. Data elements may include, without limitation, one or more digitally signed assertions. In one embodiment, a digitally signed assertion 204 is a collection of textual data signed using a secure proof as described above; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or ciphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device 152, for instance via a "wallet shortener" protocol. Where address is linked to a public key, a transferee in a digitally signed assertion 204 may record a subsequently digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such a database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 200 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device 152 may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 200 to take a powerful set of computing devices 152 a certain period of time to produce. Where one sub-listing 208 takes less time for a given set of computing devices 152 to produce the sub-listing 208 protocol may adjust the algorithm to produce the next sub-listing 208 so that it will require more steps; where one sub-listing 208 takes more time for a given set of computing devices 152 to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content containing the valid branch as valid at least a posted content. When a branch is found invalid according to this protocol, at least a posted content registered in that branch may be recreated in a new sub-listing 208 in the valid branch; the protocol may reject "double spending" posted content that transfers the same virtual currency that another posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 200.

Still referring to FIG. 2, additional data linked to at least a posted content may be incorporated in sub-listings 208 in the immutable sequential listing 200; for instance, data may be incorporated in one or more fields recognized by block-chain protocols that permit a person or computer forming at least a posted content to insert additional data in the immutable sequential listing 200. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 3:
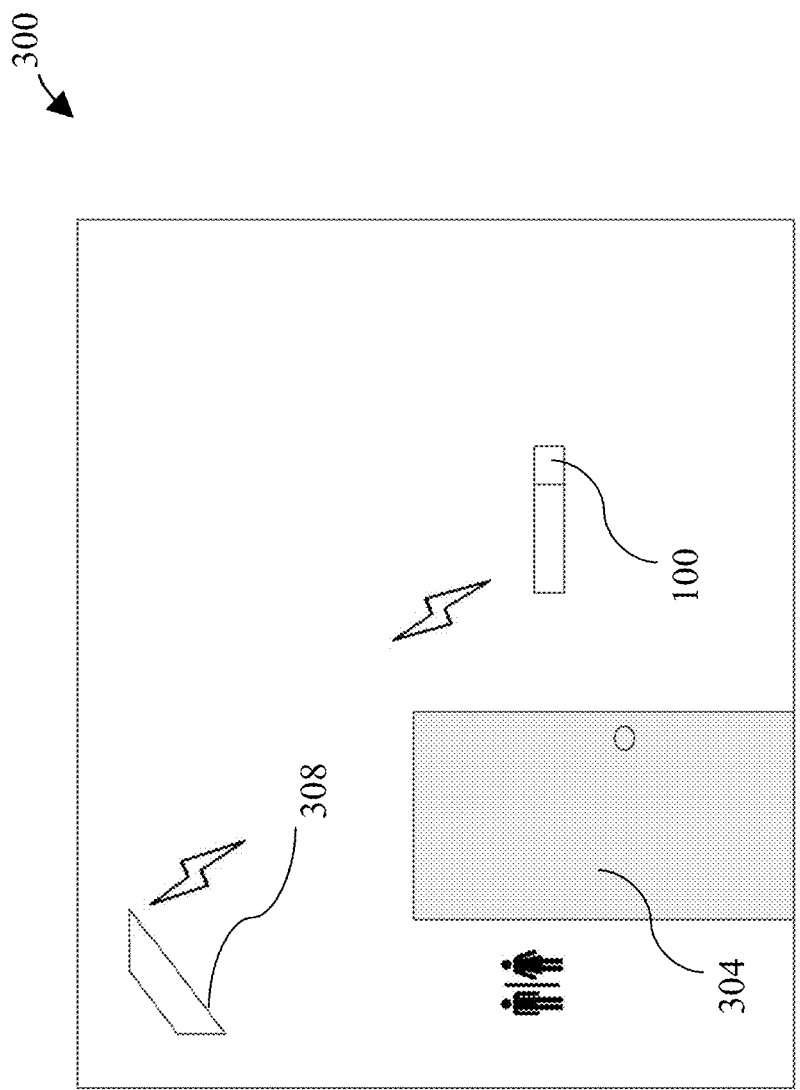
FIG. 3 is a schematic diagram illustrating an exemplary embodiment of a region subject to restricted use of cartridge-accepting device.

Referring now to FIG. 3, a non-limiting schematic illustration of an exemplary embodiment of a region 300 subject to restricted use of cartridge-accepting device 100 is illustrated. Region may include, without limitation, a room, corridor, park or other enclosed or open space where people may congregate. In a non-limiting example, region 300 may include one or more locations where surreptitious use of a cartridge-accepting device 100 such as a vaporization device may be expected and/or has been detected previously, such as bathrooms, conference rooms, or classrooms in workplaces or schools, relatively disused hallways or stairways, areas for storage or other activities involving sparse and/or sporadic attendance by people, or the like. Region 300 may have an entryway 304 such as a door, gate, or the like. A beacon 308 may be installed within region, outside region, at an entryway of region, or the like; beacon 308 may be implemented in any way as described above. In some embodiments, beacon 308 may be installed in a location that is not readily accessible, such as on a ceiling, in or on crown molding, or the like. Beacon 308 may be concealed to prevent tampering, for instance and without limitation by placement above a drop ceiling, within a light fixture, behind or within molding, under counters, or the like. Beacon 308 may include tamper-proofing and/or tamper detection, which may include without limitation any tamper-proofing or detection as described in this disclosure or in U.S. Nonprovisional application Ser. No. 17/072,892.

Figure 4:
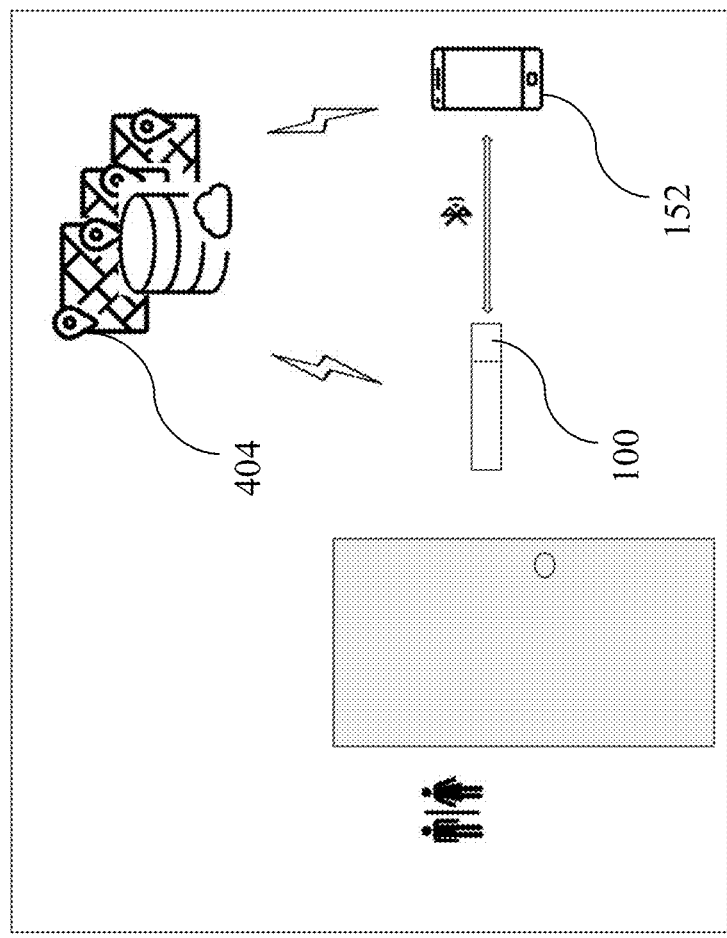
FIG. 4 is a schematic diagram illustrating an exemplary embodiment of a region subject to restricted use of cartridge-accepting device.

Referring now to FIG. 4, an exemplary embodiment of a region 400 monitored using a virtual beacon is illustrated. Region 400 may include any area as described above for region 200. In an embodiment, cartridge-accepting device 100 may communicate with GPS service and/or database 404, such as a database containing map data, which may include any database as described above. Device may determine, as a function of communication with GPS service and/or database, that device is located within or near to region 400; authentication circuit 132 may determine that use of cartridge-accepting device 100 is not permitted in region 400 and may perform any resulting action as described above. Alternatively or additionally, authentication circuit 132 and/or device 100 may communicate with computing device 152 as described above to determine that device 100 is in or near region 400; computing device 152 may communicate with GPS services and/or database, as described above, to make this determination. Map, GPS, and/or other geofence data may be stored and/or cached in memory of cartridge-accepting device 100 132 and/or computing device 152.

Figure 5:
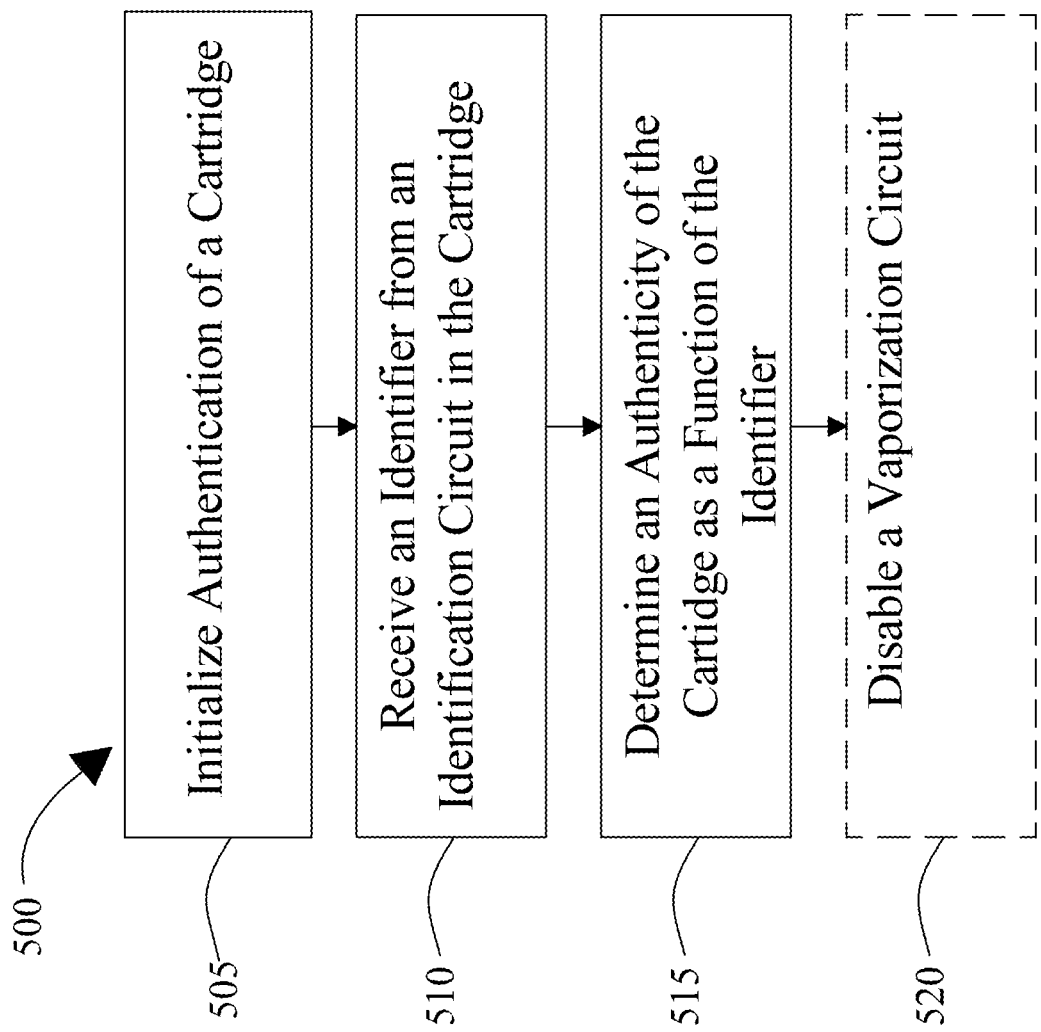
FIG. 5 is a flow diagram illustrating an exemplary embodiment of a method of cartridge authentication.

Referring now to FIG. 5, an exemplary embodiment of a method of cartridge 112 authentication by a cartridge-accepting device 100 is illustrated. At step 505, an authentication circuit 132 incorporated in a cartridge-accepting device 100 initializes authentication of a cartridge 112; this may be implemented, without limitation, as described above in reference to FIGS. 1-5. Initialization may include any commencement of any authentication process as described above in reference to FIGS. 1-5.

At step 510, and still referring to FIG. 5, authentication circuit 132 receives an identifier from an identification circuit 136 in cartridge 112; this may be implemented, without limitation, as described above in reference to FIGS. 1-5.

At step 515, and with continued reference to FIG. 5, authentication circuit 132 determines an authenticity of the cartridge 112 as a function of the identification circuit 136; this may be implemented, without limitation, as described above in reference to FIGS. 1-5.

At optional step 520, and still referring to FIG. 5, authentication circuit 132 disables a vaporization circuit 124 of cartridge-accepting device 100; this may be implemented, without limitation, as described above in reference to FIGS. 1-5.

Although embodiments as described above have been described by reference to examples of vaporization devices, persons skilled in the art will appreciate that any or all components, methods, method steps, authentication protocols, or the like may alternatively or additionally be used with regard to any other device that accepts cartridges. Examples have been presented for the purposes of illustration only, and the scope of this disclosure is not limited thereto.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
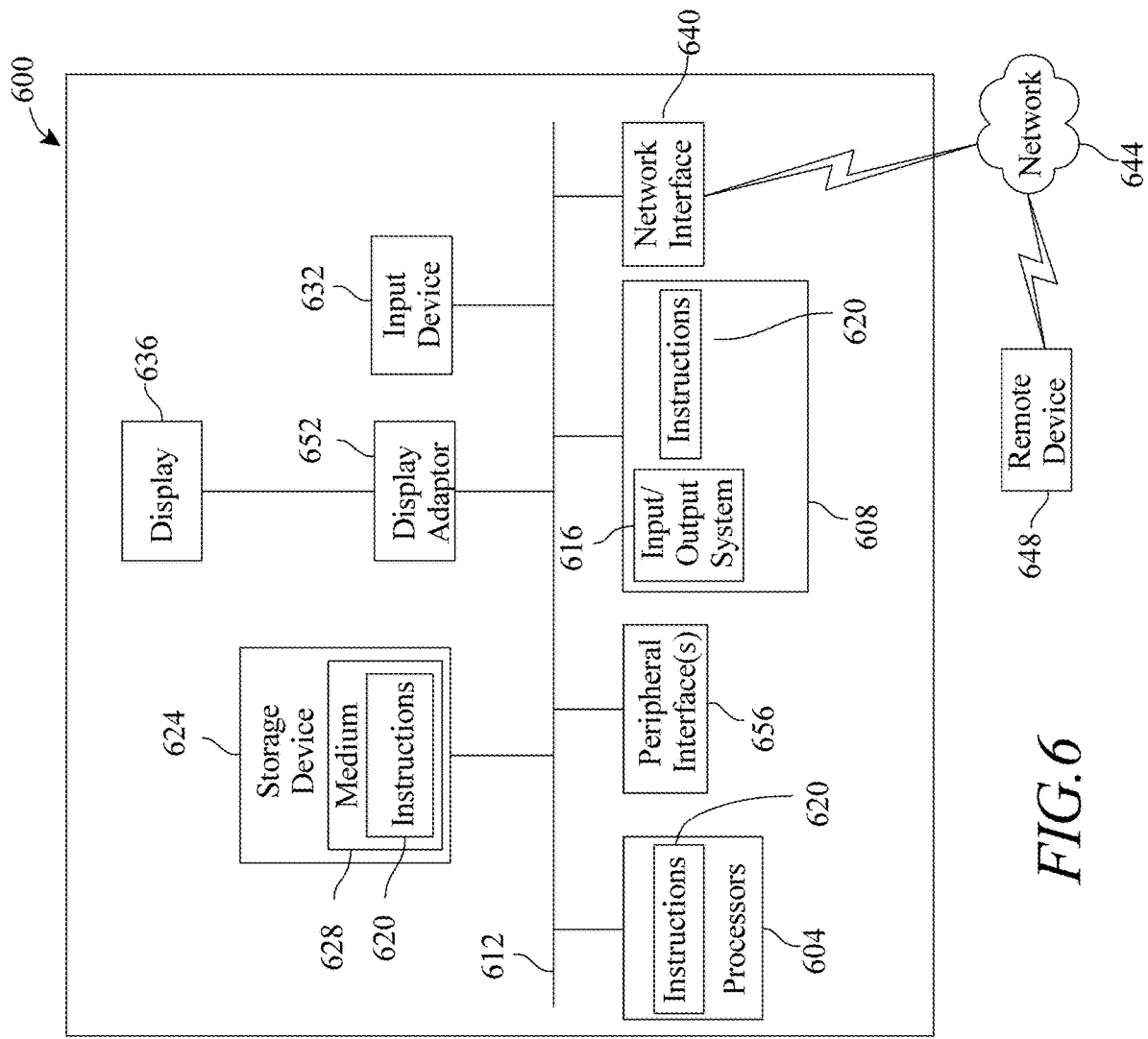
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A self-authenticating cartridge-accepting device, the device comprising:
   a cartridge receptacle adapted to accept a cartridge containing vaporizable material;
   a battery;
   a vaporization circuit electrically connected to the battery, the vaporization circuit configured to provide power from the battery to a heating element, wherein the heating element is configured to vaporize the vaporizable material; and
   an authentication circuit electrically connected to the battery, the authentication circuit configured to:
      interface with an identification circuit in the cartridge, wherein the identification circuit is configured to store an identifier of the cartridge;
      receive, via an antenna, the identifier of the cartridge from the identification circuit; and
      determine an authenticity of the cartridge based on the identifier of the cartridge, wherein the identification circuit includes a disablement component configured to, based on the cartridge being extracted from the cartridge receptacle, disable the identification circuit such that the identification circuit is prevented from outputting the identifier of the cartridge.

2. The device of claim 1, wherein the authentication circuit further comprises a wireless interrogator.

3. The device of claim 1, wherein the authentication circuit further comprises a pair of electrical contacts configured to supply an electrical current to the cartridge.

4. The device of claim 3, wherein the heating element is in the cartridge and the pair of electrical contacts are further configured to provide electrical power to the heating element.

5. The device of claim 1, wherein the disablement component is configured to disable the identification circuity by altering the identifier of the cartridge stored on the identification circuitry.

6. The device of claim 1, wherein the authentication circuit is further configured to:
   transmit the identifier to a computing device; and
   receive an authentication signal from the computing device.

7. The device of claim 1, wherein the authentication circuit is further configured to compare the identifier to a plurality of valid identifiers stored in memory of the authentication circuit.

8. The device of claim 1, wherein the authentication circuit is further configured to:
   query a listing of blacklisted identifiers; and
   determine whether the identifier is a blacklisted identifier as a function of the querying.

9. The device of claim 1, wherein the authentication circuit is configured to activate an indicator light upon determining the authenticity of the cartridge.

10. The device of claim 1, wherein the authentication circuit is configured to transmit a message to a computing device as a function of determining the authenticity of the cartridge.

11. The device of claim 1, wherein the authentication circuit is configured to determine that the cartridge is not authentic and disable the vaporization circuit.

12. The device of claim 1, wherein the authentication circuit is configured to:
   receive a local wireless signal; and
   disable the vaporization circuit as a function of the local wireless signal.

13. The device of claim 1, wherein the authentication circuit is configured not to function based on the authentication circuit not being communicatively connected to a computing device.

14. The device of claim 1, wherein the authentication circuit is configured to:
   determine that the cartridge is authenticated; and
   transition to an authenticated state as a function of the determination.

15. The device of claim 1, wherein the authentication circuit is configured to:
   detect extraction of the cartridge; and
   transition to a non-authenticated state as a function of the detection.

* * * * *